(12) United States Patent
Choi et al.

(10) Patent No.: US 10,661,841 B2
(45) Date of Patent: May 26, 2020

(54) SIDE VEHICLE BODY REINFORCING STRUCTURE

(71) Applicants: Hyundai Motor Company, Seoul (KR); Kia Motors Corporation, Seoul (KR)

(72) Inventors: Seongeun Choi, Gyoenggi-do (KR); Kun Ho Park, Gyeonggi-do (KR); Seung Min Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 16/041,162

(22) Filed: Jul. 20, 2018

(65) Prior Publication Data

US 2019/0185071 A1 Jun. 20, 2019

(30) Foreign Application Priority Data

Dec. 15, 2017 (KR) .......................... 10-2017-0173620

(51) Int. Cl.
| | |
|---|---|
| *B60J 7/00* | (2006.01) |
| *B62D 25/20* | (2006.01) |
| *B60K 1/04* | (2019.01) |
| *B62D 29/00* | (2006.01) |
| *B62D 25/02* | (2006.01) |

(52) U.S. Cl.
CPC ............ *B62D 25/2036* (2013.01); *B60K 1/04* (2013.01); *B62D 25/025* (2013.01); *B62D 29/002* (2013.01); *B60K 2001/0438* (2013.01)

(58) Field of Classification Search
CPC .. B62D 25/2036; B62D 25/025; B62D 25/04; B62D 25/2018; B62D 25/14; B62D 21/157; B62D 25/02
See application file for complete search history.

(56) References Cited

U.S. PATENT DOCUMENTS

| | | | | |
|---|---|---|---|---|
| 5,613,727 | A * | 3/1997 | Yamazaki | B62D 25/02 296/187.12 |
| 7,644,978 | B2 * | 1/2010 | Tosaka | B62D 21/157 296/187.08 |
| 10,183,700 | B2 * | 1/2019 | Hata | B62D 21/157 |
| 10,207,574 | B2 * | 2/2019 | Ozawa | B60K 1/04 |

(Continued)

FOREIGN PATENT DOCUMENTS

KR 10-2018-0055249 5/2018

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A side vehicle body reinforcing structure is provided to improve efficiency of load transferring and performance against a vehicle collision. The structure includes a center floor panel that forms a bottom surface of a vehicle body and a battery case coupled to a lower surface of the panel. A side sill is coupled with both sides of the panel in a width direction to be disposed at both sides of the battery case, and has a cross-section formed in a box shape and extends in a front and rear direction of a vehicle body. A seat cross member has a lower end coupled with the panel, and crosses the panel in a width direction to be coupled with the side sill. A pipe nut extends vertically to sequentially penetrate the battery case, the side sill, the panel, and the seat cross member and is fixed to the battery case.

13 Claims, 2 Drawing Sheets

(56) References Cited

U.S. PATENT DOCUMENTS

| | | | |
|---|---|---|---|
| 10,259,506 B2* | 4/2019 | Ayukawa | B62D 25/2036 |
| 10,293,860 B1* | 5/2019 | Cooper | B60L 50/66 |
| 10,358,168 B2* | 7/2019 | Atsumi | B62D 23/005 |
| 2008/0106119 A1* | 5/2008 | Ma | B62D 21/157 |
| | | | 296/187.12 |
| 2013/0026786 A1* | 1/2013 | Saeki | B60K 1/04 |
| | | | 296/187.12 |
| 2015/0174996 A1* | 6/2015 | Ikeda | B60K 1/04 |
| | | | 180/68.5 |
| 2016/0083017 A1* | 3/2016 | Sakaguchi | B62D 21/157 |
| | | | 296/187.12 |
| 2016/0114667 A1* | 4/2016 | Ikeda | B60K 1/04 |
| | | | 180/68.5 |
| 2016/0114699 A1* | 4/2016 | Hokazono | B60L 11/1877 |
| | | | 180/68.5 |
| 2016/0244098 A1* | 8/2016 | Kanemori | B62D 21/152 |
| 2016/0288636 A1* | 10/2016 | Kamimura | B62D 25/2036 |
| 2016/0311301 A1* | 10/2016 | Ikeda | B62D 29/001 |
| 2017/0305251 A1* | 10/2017 | Hara | B60K 1/04 |
| 2018/0065678 A1* | 3/2018 | Tutzer | F16F 7/122 |
| 2018/0134320 A1* | 5/2018 | Jeong | B62D 25/2036 |
| 2019/0193790 A1* | 6/2019 | Choi | B62D 25/025 |

\* cited by examiner

SIDE VEHICLE BODY REINFORCING STRUCTURE

CROSS-REFERENCE TO RELATED APPLICATION

This application claims priority to and the benefit of Korean Patent Application No. 10-2017-0173620 filed on Dec. 15, 2017, the entire contents of which are incorporated herein by reference.

BACKGROUND

(a) Field of the Invention

The present invention relates to a side vehicle body reinforcing structure, and more particularly, to a side vehicle body reinforcing structure for a vehicle in which a high-capacity battery is mounted.

(b) Description of the Related Art

Generally, in a front vehicle body of a vehicle, a front side member that extends in a front and rear direction of a vehicle body is respectively disposed at both sides in a width direction of a vehicle body to reinforce the structural strength of front vehicle body. A side sill, which extends in a front and rear direction of a vehicle body and is respectively disposed at both sides in a width direction of a vehicle body, is connected with a rear end of the front side member.

Meanwhile, a floor panel that forms a bottom surface of a vehicle body includes a front floor panel, a center floor panel, and a rear floor panel from a front of a vehicle in a front and rear direction. Herein, the front floor panel is included at a bottom surface of an engine compartment, the center floor panel is included at a bottom surface of a passenger compartment, and the rear floor panel is included at a bottom surface of a luggage compartment. An accelerator pedal, a brake pedal, a seat for a passenger, and the like may be mounted at an upper surface of the center floor panel, and an exhaust pipe, a propeller shaft, and the like may be mounted at a lower surface of the center floor panel. In addition, the side sill is coupled to the center floor panel at both sides in a width direction of a vehicle body to cope with a side collision of a vehicle.

Furthermore, a battery case for mounting a high-capacity battery to a lower surface of the center floor panel or the rear floor panel is provided to an electric vehicle, which represents all vehicles moved by electric power including a hybrid electric vehicle. In addition, for a vehicle which is configured so that a propeller shaft passes in a front and rear direction of a vehicle such as a vehicle having an engine or a drive motor mounted to a front portion and a rear wheel is a driving wheel, a tunnel having a cross-section in a "U" shape to be upwardly concave is formed at the center floor panel such that the propeller shaft is arranged therein. However, when a structure for mounting the battery case in which the high-capacity battery is disposed becomes complex, and a part that guides a load transferred through this structure is severed, performance against a collision of a vehicle body, especially that of a side vehicle body, may be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a side vehicle body reinforcing structure having advantages of improving efficiency of transferring a load and improving performance against a collision of a vehicle body, especially that of a side vehicle body, when a battery case is provided within the vehicle.

A side vehicle body reinforcing structure according to an exemplary embodiment of the present invention may include: a center floor panel constituting a bottom surface of a vehicle body; a battery case combined to a lower surface of the center floor panel; a side sill coupled with both sides of the center floor panel in a width direction to be disposed at both sides of the battery case in a width direction, and having a cross-section formed in a box shape and extending in a front and rear direction of a vehicle body; a seat cross member with a lower end coupled with the center floor panel, and crossing the center floor panel in a width direction to be coupled with the side sill; and a pipe nut extended in a vertical direction to sequentially penetrate the battery case, the side sill, the center floor panel, and the seat cross member and fixed to the battery case. The pipe nut may be a nut which is formed in a pipe shape.

The side vehicle body reinforcing structure according to an exemplary embodiment of the present invention may further include an engaging bolt inserted from a lower side into the pipe nut and engaged to the pipe nut to couple constituent elements. Additionally, the side vehicle body reinforcing structure may further a combination reinforcing portion formed to be downwardly protruded from the center floor panel and coupled with an inside plate of the side sill; and a first reinforcing member provided in a box shape of the side sill and disposed to be spaced outside from an inside plate of the side sill to connect an upper side plate of the side sill with a lower side plate of the side sill.

The first reinforcing member may extend from a front end of the side sill to a rear end of the side sill. The side vehicle body reinforcing structure according to an exemplary embodiment of the present invention may further include a second reinforcing member provided in a box shape of the side sill to be supported to the first reinforcing member and may have a cross-section of a "U" shape to be convex from the first reinforcing member toward the outside in a width direction of a vehicle body. The second reinforcing member may extend from a front end of the side sill to a rear end of the side sill.

An inside surface of the first reinforcing member in a width direction of a vehicle body may be supported to an outside end of the pipe nut in a width direction of a vehicle body. Expansion foam may be filled into a space surrounded by the side sill and the first reinforcing member. The expansion foam may be filled into a space surrounded by the second reinforcing member and the first reinforcing member.

BRIEF DESCRIPTION OF THE DRAWINGS

The above and other aspects, features and advantages of the present invention will be more apparent from the following detailed description taken in conjunction with the accompanying drawings, in which.

DESCRIPTION OF SYMBOLS

Figure 1:
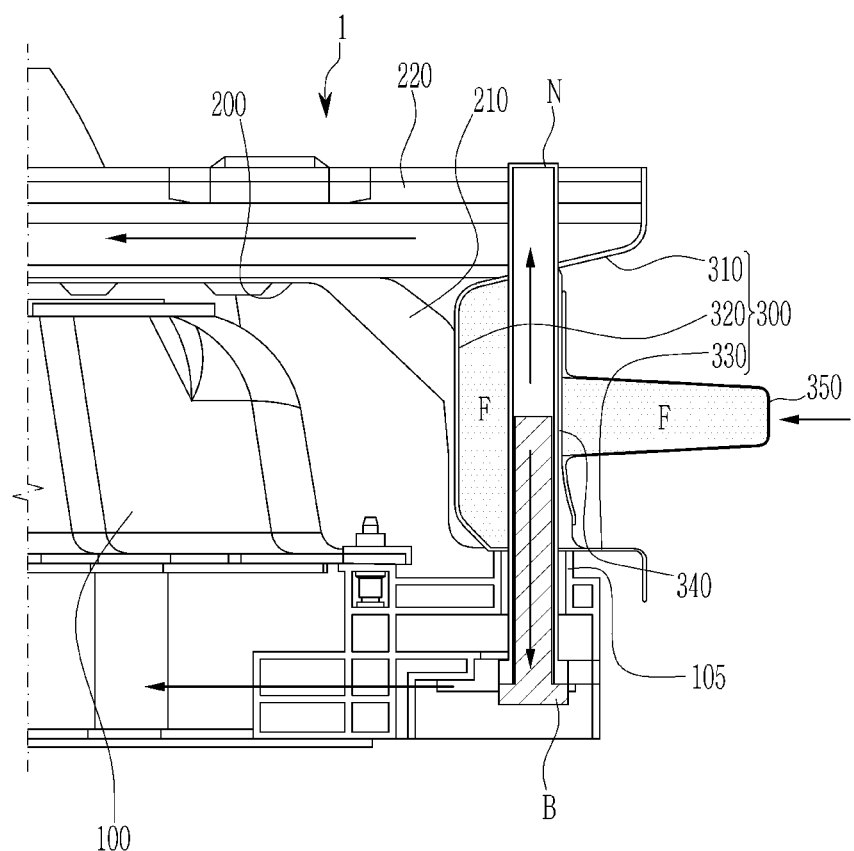
FIG. 1 is a schematic diagram showing the front of a side vehicle body reinforcing structure according to an exemplary embodiment of the present invention.

1: side vehicle body reinforcing structure
100: battery case
200: center floor panel
210: combination reinforcing portion
220: seat cross member
300: side sill
310: side sill upper panel
320: side sill interior panel
330: side sill lower panel
340: first reinforcing member
350: second reinforcing member
B: engaging bolt
F: expansion foam
N: pipe nut

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. In this specification, directions of upper, lower, front, and rear mean upper, lower, front, and rear directions of an ordinary vehicle, and outside and inside mean relatively outside and inside with respect to a width direction of an ordinary vehicle.

Figure 2:
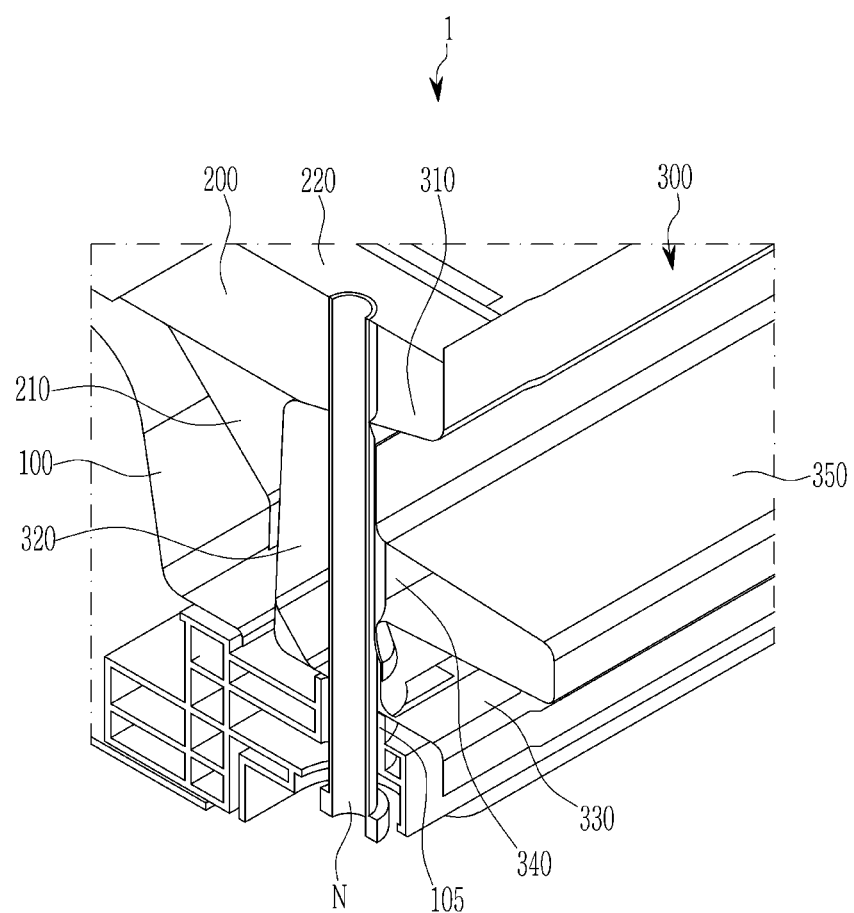
FIG. 2 is a perspective view of a side vehicle body reinforcing structure according to an exemplary embodiment of the present invention.

FIG. 1 is a schematic diagram showing the front of a side vehicle body reinforcing structure according to an exemplary embodiment of the present invention, and FIG. 2 is a perspective view of a side vehicle body reinforcing structure according to an exemplary embodiment of the present invention.

As shown in FIG. 1 and FIG. 2, a side vehicle body reinforcing structure 1 according to an exemplary embodiment of the present invention may be connected with a battery case 100. In addition, a side sill 300 may be combined with both sides of a center floor panel 200 which is included at a bottom surface of a passenger compartment in a width direction of a vehicle body. A basic composition of the center floor panel 200 and the side sill 300 is well known to a person of ordinary skill in the art, and thus, a detailed description thereof will be omitted.

The battery case 100 may be applied to an electric vehicle which represents all vehicles moved by electric power including a hybrid electric vehicle. In addition, the battery case 100 may be provided to the electric vehicle for mounting a high-capacity battery (not shown) by accommodating the high-capacity battery therein. The electric power of the high-capacity battery may be transmitted to a drive motor (not shown), and a high voltage wire (not shown) may be arranged to be crossed in a front and rear direction of a vehicle to connect the high-capacity battery and the drive motor. Meanwhile, in a vehicle using electric power for driving torque, the high-capacity battery, the drive motor, and the components for supplying electric power are well known to a person of ordinary skill in the art, and thus, detailed descriptions thereof will be omitted.

Furthermore, a seat cross member 220 may be disposed at the center floor panel 200. In particular, the seat cross member 220 may be disposed to cross the center floor panel 200 in a width direction of a vehicle body. In addition, the seat cross member 220 may have a lower end coupled to the center floor panel 200 and both ends of the seat cross member 220 may be coupled to the side sill 300 in a width direction of a vehicle body. Further, a plurality of seat cross members 220 may be arranged in a front and rear direction of a vehicle body.

A side vehicle body reinforcing structure 1 according to an exemplary embodiment of the present invention may include the center floor panel 200 coupled to an upper side of the battery case 100 and the side sill 300 disposed at both sides of the battery case 100 in a width direction of a vehicle body by the combination of the center floor panel 200 and the battery case 100, and the side vehicle body reinforcing structure 1 may further include a combination reinforcing portion 210, a first reinforcing member 340, a second reinforcing member 350, a pipe nut N, and an engaging bolt B.

In particular, the combination reinforcing portion 210 may be formed at the center floor panel 200. In addition, the combination reinforcing portion 210 may protrude downwardly from the center floor panel 200 to be connected with the side sill 300. In this regard, the side sill 300 may have an inner panel disposed relatively inward with respect to a width direction of a vehicle body and an outer panel disposed relatively outward with respect to a width direction of a vehicle body are coupled with each other to have a cross-section being formed in a box shape, and this composition of the side sill 300 is well known to a person of ordinary skill in the art, however, only the inner panel of the side sill 300 is illustrated in FIG. 1 and FIG. 2.

In addition, the side sill 300 may include a side sill upper panel 310 which is an upper side plate thereof, a side sill interior panel 320 which is an inside plate thereof, and a side sill lower panel 330 which is a lower side plate thereof to form a box shape. The side sill upper panel 310 and the side sill lower panel 330 may be formed at the inner panel and the outer panel of the side sill 300, and the side sill interior panel 320 may be formed at the inner panel of the side sill 300. Meanwhile, both sides of the center floor panel 200 in a width direction of a vehicle body may be combined to the side sill upper panel 310 of the side sill 300, and the combination reinforcing portion 210 may be combined to the side sill interior panel 320 of the side sill 300. Therefore, a binding force between the center floor panel 200 and the side sill 300 may be improved due to the combination reinforcing portion 210.

Further, the first reinforcing member 340 may be provided in a box shape of the side sill 300. In addition, the first reinforcing member 340 may be disposed to be spaced outside from the side sill interior panel 320 to connect the side sill upper panel 310 with the side sill lower panel 330. The first reinforcing member 340 may also extend from a front end of the side sill 300 to a rear end of the side sill 300.

The second reinforcing member 350 may be provided in a box shape of the side sill 300. In addition, the second reinforcing member 350 may be supported to the first reinforcing member 340 to form a cross-section in a "U" shape to be convex from the first reinforcing member 340 toward the outside in a width direction of a vehicle body. Meanwhile, a cross-section in a "U" shape of the second reinforcing member 350 may be positioned apart from the outer panel of the side sill 300. The second reinforcing member 350 may also extend from a front end of the side sill 300 to a rear end of the side sill 300.

The pipe nut N may extend in a vertical direction to sequentially penetrate the battery case 100, the side sill lower panel 330, the side sill upper panel 310, the center floor panel 200, and the seat cross member 220 from a lower side. The pipe nut N may be a nut formed in a pipe shape and a screw thread may be formed on an interior circumference thereof. Further, the pipe nut N may be fixed to the battery case 100, and an accommodating bore 105, which is bored to accommodate the pipe nut N, may be formed at the battery case 100. Meanwhile, an inside surface of the first reinforcing member 340 in a width direction of a vehicle body may be supported to an outside end of the pipe nut N in a width direction of a vehicle body.

The battery case 100, the side sill lower panel 330, the side sill upper panel 310, the center floor panel 200, the seat cross member 220, and the first reinforcing member 340 may be integrally connected by the pipe nut N, thereby continuously transferring a load. In FIG. 1, load transmission paths in a collision of a side vehicle body are illustrated by arrows. The engaging bolt B may be inserted from a lower side into the pipe nut N and may be engaged to the pipe nut N. The engaging bolt B may couple constituent elements of a vehicle body such as a suspension (not shown). Moreover, an expansion foam F may be filled into a space surrounded by the side sill upper panel 310, the side sill interior panel 320, the side sill lower panel 330, and the first reinforcing member 340 or a space surrounded by a cross-section having a "U" shape of the second reinforcing member 350 and the first reinforcing member 340 for reinforcing strength.

According to an exemplary embodiment of the present invention, performance against a collision of a vehicle body, especially that of a side vehicle body, may be improved as a structure for mounting the battery case 100 is connected with a vehicle body so that severing of a part through which loads are transferred through this structure is decreased and continuity is ensured.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A side vehicle body reinforcing structure, comprising:
   a center floor panel that forms a bottom surface of a vehicle body;
   a battery case coupled to a lower surface of the center floor panel;
   a side sill coupled with the center floor panel in a width direction to be disposed at the battery case in a width direction;
   a seat cross member having a lower end coupled with the center floor panel, and crossing the center floor panel in a width direction to be coupled with the side sill; and
   a pipe nut extended in a vertical direction to sequentially penetrate the battery case, the side sill, the center floor panel, and the seat cross member and fixed to the battery case.

2. The side vehicle body reinforcing structure of claim 1, wherein the pipe nut is a nut which is formed in a pipe shape.

3. The side vehicle body reinforcing structure of claim 2, further comprising:
   an engaging bolt inserted into the pipe nut and engaged to the pipe nut to couple constituent elements.

4. The side vehicle body reinforcing structure of claim 1, further comprising:
   a combination reinforcing portion formed to protrude downwardly from the center floor panel and coupled with an inside plate of the side sill.

5. The side vehicle body reinforcing structure of claim 1, further comprising:
   a first reinforcing member provided in the side.

6. The side vehicle body reinforcing structure of claim 5, wherein the first reinforcing member extends from front end of the side sill to a rear end of the side sill.

7. The side vehicle body reinforcing structure of claim 5, further comprising:
   a second reinforcing member adapted to have a cross-section of a "U" shape.

8. The side vehicle body reinforcing structure of claim 7, wherein the second reinforcing member extends from a front end of the side sill to a rear end of the side sill.

9. The side vehicle body reinforcing structure of claim 5, wherein an inside surface of the first reinforcing member is supported to an outside end of the pipe nut.

10. The side vehicle body reinforcing structure of claim 6, wherein expansion foam is filled into a space surrounded by the side sill and the first reinforcing member.

11. The side vehicle body reinforcing structure of claim 7, wherein expansion foam is filled into a space surrounded by the second reinforcing member and the first reinforcing member.

12. The side vehicle reinforcing member of claim 1 wherein the side side has a cross-section formed in a box shape.

13. A vehicle comprising a side vehicle reinforcing member of claim 1.

* * * * *